United States Patent [19]

Towers et al.

[11] Patent Number: 5,609,449
[45] Date of Patent: Mar. 11, 1997

[54] APPARATUS FOR FITTING AND FOR DRILLING VARIABLE SIZE HOLES IN A BOWLING BALL

[76] Inventors: Bill E. Towers, c/o Brunswick Bowling & Billiards Corp., 525 W. Laketon, Muskegon, Mich. 49443; Ladislav Jurik, c/o JAL Enterprises, Inc., 770 G.N. Church Rd., Elmhurst, Ill. 60126; Richard L. Weinbrenner, c/o CyberPak Co., P.O. Box 190, Lemont, Ill. 60439

[21] Appl. No.: 495,752

[22] Filed: Jun. 26, 1995

Related U.S. Application Data

[63] Continuation-in-part of Ser. No. 380,077, Jan. 30, 1995, which is a continuation-in-part of Ser. No. 336,143, Nov. 14, 1994.

[51] Int. Cl.[6] .................... B23C 3/00; B23B 41/00
[52] U.S. Cl. .................... 409/200; 408/3; 408/13; 408/150; 408/173; 409/204
[58] Field of Search .................... 409/199, 200, 409/204; 408/3, 13, 104, 105, 107, 150, 151, 153, 173, 178, DIG. 1

[56] References Cited

U.S. PATENT DOCUMENTS

| | | |
|---|---|---|
| 2,775,147 | 12/1956 | Schnebeli et al. .................... 408/151 |
| 3,465,619 | 9/1969 | Blaker et al. .................... 408/DIG. 1 |
| 3,640,633 | 2/1972 | Sersch et al. .................... 408/150 |
| 3,685,917 | 8/1972 | Patt .................... 408/150 |
| 3,700,345 | 10/1972 | Schubert .................... 408/150 |
| 3,884,590 | 5/1975 | Skrentner et al. .................... 408/150 |
| 4,260,306 | 4/1981 | Weis .................... 409/200 |

*Primary Examiner*—Daniel W. Howell
*Attorney, Agent, or Firm*—Wood, Phillips, VanSanten, Clark & Mortimer

[57] ABSTRACT

The length of a drilling cycle in a bowling ball fitting and drilling method is reduced in an apparatus including a fitting apparatus (10) usable by a bowler to determine the size of a thumb hole and at least one finger hole to be drilled in a bowling ball and including a drilling apparatus (14) having a ball support (22), a rotatable drilling tool (30) movable relative thereto and a drive (36) for the drilling tool (30). A dove tail slide connection (50), (52) provides for moving the drilling tool (30) in an orbital path and an adjustment mechanism (56), (58), (60), (62), (70), (84) is provided whereby the diameter of the orbital path may be varied to vary the diameter of a hole drilled in the ball. A control motor (122) is responsive to the fitting apparatus (10) to operate the adjusting mechanism (56), (58), (60), (62), (70), (84). The control motor 122 is carried by the drive (36) and thus, may be adjusted "on the fly".

11 Claims, 4 Drawing Sheets

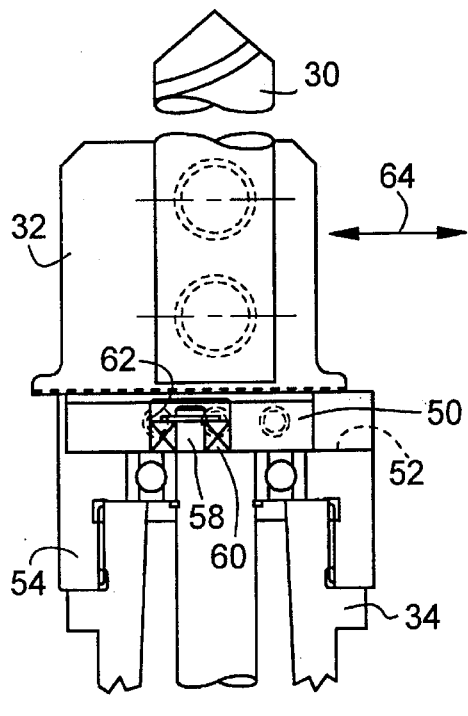
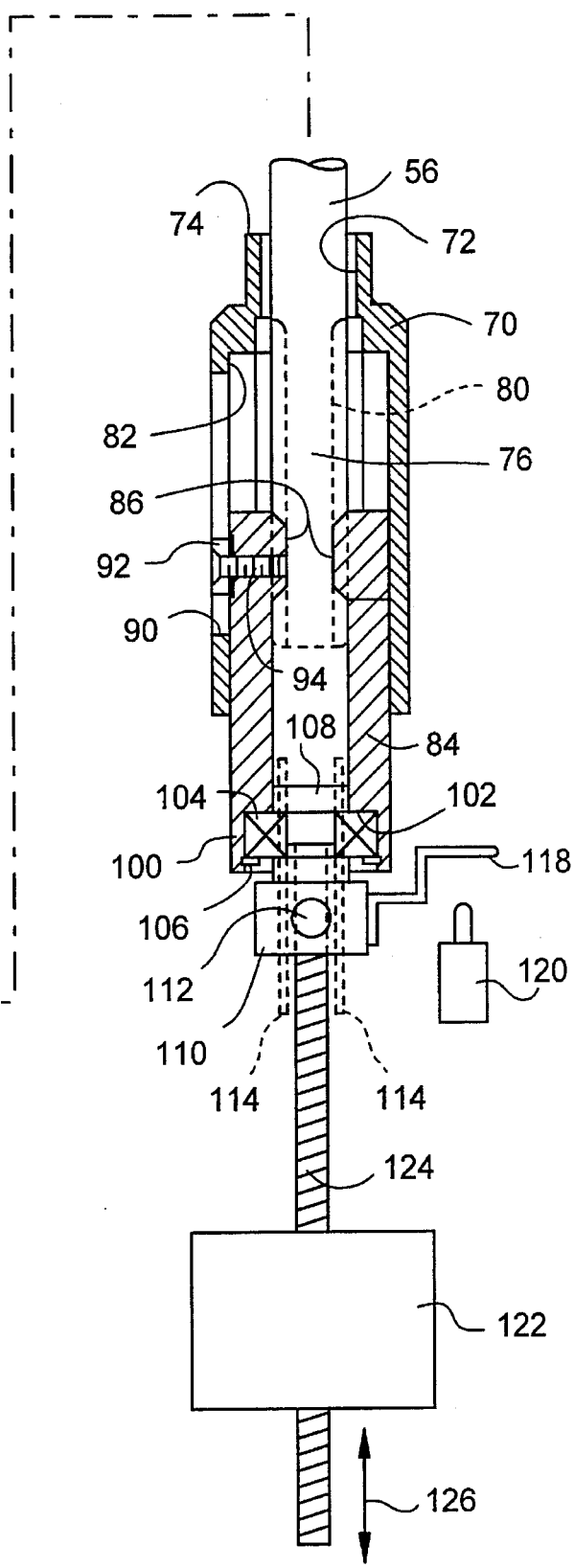
FIG. 3

APPARATUS FOR FITTING AND FOR DRILLING VARIABLE SIZE HOLES IN A BOWLING BALL

CROSS-REFERENCE

This application is a continuations-in-part of our co-pending application Ser. No. 08/380,077, filed Jan. 30, 1995, which in turn is a continuation-in-part of our co-pending application Ser. No. 08/336,143, filed Nov. 14, 1994.

FIELD OF THE INVENTION

This invention relates to bowling games, and more particularly, to bowling balls used in such games. Specifically, the invention relates to fitting a ball to a bowler and drilling finger holes in the ball after it has been fitted.

BACKGROUND OF THE INVENTION

As is well known, a bowler purchases a new bowling ball in a form that is free from finger holes. In the usual case, the ball is sold with an index mark which is generally intended to be located centrally of the finger holes. Holes are drilled about the index mark, typically for receipt of the middle finger and the ring finger on one side of the index mark and a hole for the thumb on the opposite side thereof.

The holes may be bored to various diameters to fit the finger size of the bowler. Typically, thumb hole and finger hole diameters will range from ⅝ of an inch to 1³⁄₃₂ of an inch.

Other dimensions of concern include the "span" and the "bridge".

Span is the distance between the near edges of the thumb hole and either of the finger holes, whereas bridge is the distance between the near edges of the two finger holes. "Pitch" is still another parameter. Pitch is the distance between the center line of a finger or thumb hole and a parallel radius of the ball. As can be readily imagined, with the number of variables involved, drilling the finger holes in a bowling ball is not a job to be relegated to the ordinary man on the street.

Generally, then, the balls are purchased at stores that specialize in bowling goods and/or bowling "pro" shops where there is sufficient traffic in bowling ball sales to justify the presence of a ball drilling apparatus as well as an experienced operator for the drilling apparatus. In addition, it is necessary that there be a person in attendance who is knowledgeable in fitting a ball to a bowler so that the proper hole diameters, span, pitch and bridge may be determined to set the parameters for the drilling operation.

It is believed that the foregoing situation has deterred many bowlers from buying their own balls, the bowlers relying instead on so called "house" balls maintained in most bowling establishments for use by patrons who do not own their own balls.

The problem may be compounded because many such establishments are relatively small and do not have the personnel available to fit the ball and then drill it during a single visit by the patron. Frequently, the ball will be fitted during regular store hours, but will not be drilled until after store hours, necessitating a return trip by the purchaser to pick-up the drilled ball.

And, frequenting such a store specializing in bowling goods to make the purchase of a bowling ball is a less likely occurrence than a person frequenting a mass merchandiser, discount warehouse or the like. Consequently, the purchase of a bowling ball by many is put off, or does not occur at all because of this factor.

One of the parameters of concern in fitting a bowling ball is the size or diameter of the finger and thumb holes that must drilled therein. In our co-pending application Ser. No. 08/336,143, filed Nov. 14, 1994, the details of which are herein incorporated by reference, there is disclosed a system whereby the bowling ball is drilled with holes of constant diameter and inserts having a hole of the diameter that fits the bowler best inserted in the constant diameter holes to complete the fitting process. While this system is satisfactory for its intended purpose, it does require the fitting of inserts to a drilled bowling ball, as well as the provision of a supply of the inserts in all sizes so that a bowler can be properly fitted. If a complete inventory of inserts is not maintained at all times, then there is always the risk that a bowler cannot be properly fitted because an insert of the proper size is not on hand.

To avoid this problem, our commonly assigned application Ser. No. 08/380,077, filed Jan. 30, 1995, the details of which are herein incorporated by reference, discloses a means whereby the fitting apparatus provides electrical signals indicative of the size of each finger hole and thumb hole to be drilled in a ball and the drilling part of the apparatus responds accordingly. As disclosed in application Ser. No. 08/380,077, a drill bit may be rotated about its axis or may be revolved in an orbital fashion about the axis of rotation of a drive motor or the like. The diameter of the hole being drilled is determined by the spacing between the orbital path of movement of the drill bit and the axis of rotation of the drive motor.

According to application Ser. No. 08/380,077, a carriage mounting the drive motor and the bit may be moved away from a ball support and into engagement with an adjustment mechanism. The adjusting mechanism receives complete size information from the fitting part of the apparatus and adjusts the diameter of the orbital path of the bit to achieve the desired hole diameter. Once this adjustment is made, the carriage is then moved towards the ball support advancing the bit and drive source therewith to drill the hole.

Since a typical bowling ball will be drilled with three holes, one for each of two fingers and one for the thumb, and because not all holes will have the same size, it is necessary that the system of application Ser. No. 08/380,077 be adjusted after each hole is drilled by stopping the bit drive and moving the carriage away from the ball support to engage the adjusting mechanism, and perform the necessary adjustment is then made before the next hole can be drilled. This, of course, is somewhat time consuming and in the mass merchandising environment that is envisioned for the apparatus, undesirable because purchasers are anxious to complete their purchase and move on.

The present invention is directed to overcoming one or more of the above problems.

SUMMARY OF THE INVENTION

It is the principal object of the invention to provide a new and improved apparatus for fitting and drilling bowling balls. More specifically, it is an object of the invention to provide such an apparatus that is capable of drilling holes of varying sizes in a bowling ball in response to fitting information received from a fitting apparatus and performing the drilling operation in a minimum length of time.

An exemplary embodiment of the invention achieves the foregoing object in an apparatus for use in fitting bowling balls to bowlers and for drilling the balls which includes a fitting apparatus usable by a bowler to determine the size of a thumb hole and at least one finger hole to be drilled in a bowling ball. The apparatus also includes a drilling apparatus made up of a frame with a ball support on the frame. A carriage is mounted on the frame and means are provided whereby relative movement may be effected between the carriage and the ball support. A drilling tool is mounted on the carriage and is movable in an orbital path around an axis and an adjusting mechanism is provided for altering the distance between the axis and the orbital path. A control motor is mounted on the carriage and is responsive to the fitting apparatus for driving the adjusting mechanism.

According to the invention, the control motor can be operated while relative movement between the carriage and the ball support is being effected to obtain the adjustment in a much shorter period of time than was permitted with our earlier apparatus.

In one embodiment of the invention, the carriage is mounted on the frame for movement towards and away from the ball support.

In a highly preferred embodiment, a drive motor is located on the carriage for driving the drilling tool in the orbital path and has a rotary output shaft. The adjusting mechanism couples the tool to the shaft and is rotatable with the shaft. A rotatable coupling is provided between the adjusting mechanism and the control motor so that the shaft may rotate relative to the control motor.

In a highly preferred embodiment, the shaft is hollow and the adjusting mechanism includes a rod within the shaft and a reciprocating-to-rotary motion conversion mechanism having a reciprocal input and an rotary output to the rod. The control motor has a reciprocal output and a rotary coupling connects the reciprocal input of the motion conversion mechanism and the reciprocal output of the control motor.

In a highly preferred embodiment, the rotary output comprises a helical end on the rod and the reciprocal input comprises a nut with a helical cavity receiving the helical end of the rod.

Preferably, the control motor is a bi-directional stepper motor and the apparatus further includes a home sensing switch on the carriage and an actuator for the switch carried by the nut.

In one embodiment, the means that move the drill in an orbital path includes a connection between the drilling tool and the drive motor that includes an offset.

The distance between the orbital path and the axis can be selectively varied by means for selectively increasing or decreasing the offset in the connection.

Other objects and advantages will become apparent from the following specification taken in connection with the accompanying drawings.

DESCRIPTION OF THE DRAWINGS

FIG. 3 is an enlarged, fragmentary view of an adjusting mechanism employed in the invention with parts shown in section.

DESCRIPTION OF THE PREFERRED EMBODIMENT

Figure 1:
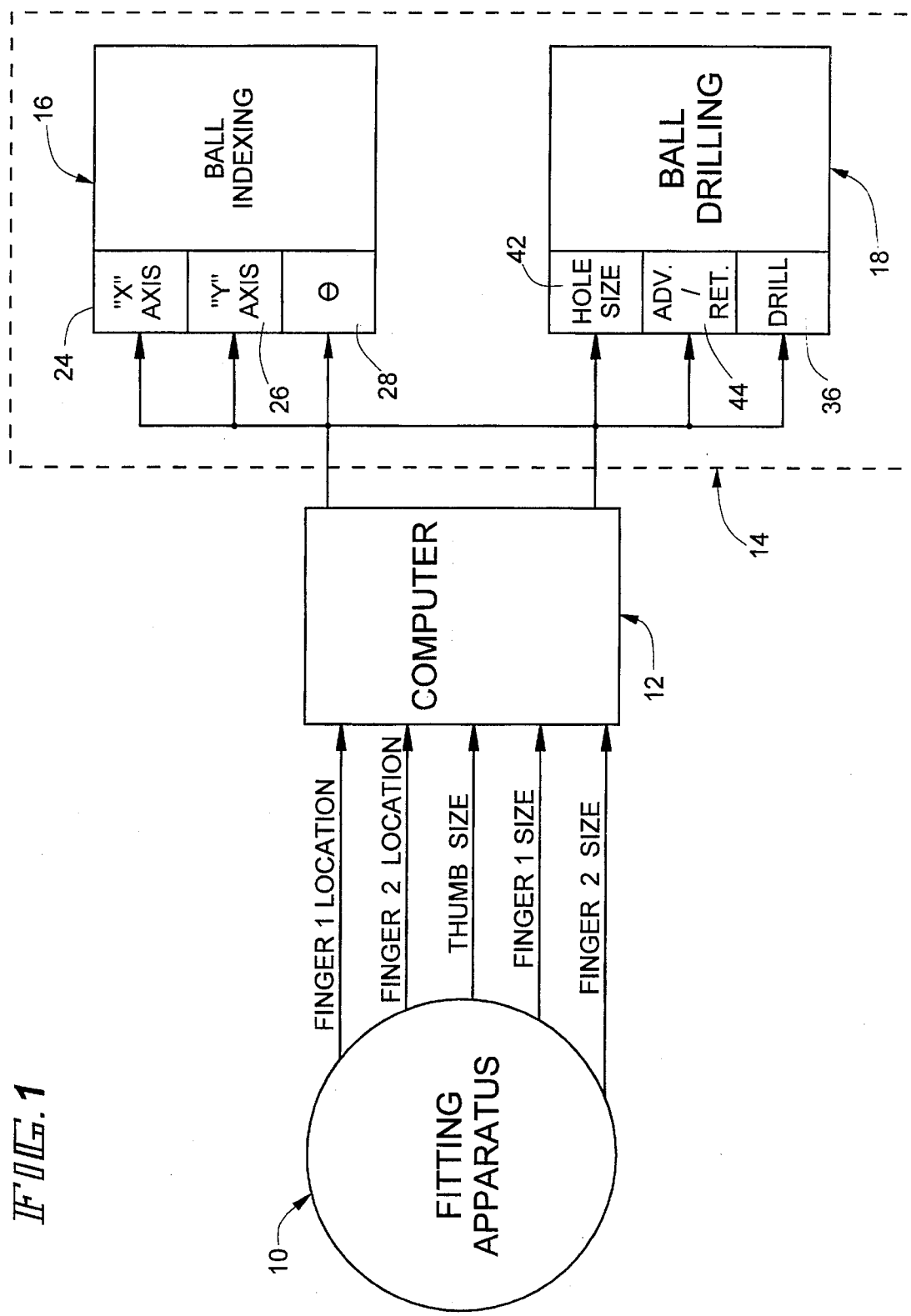
FIG. 1 is a block diagram of a fitting and drilling apparatus made according to the invention.

An exemplary embodiment of the invention is illustrated in the drawings and with reference to FIG. 1 is seen to include a fitting apparatus, generally designated 10. The fitting apparatus may be of the form described in the two previously identified co-pending applications and as such provide electrical signals representing a minimum of five pieces of information. One signal provides an indication of the location of the first finger hole relative to an index mark for a first finger. A second electrical signal provides the same information but for a second finger. A third signal provides an indication of the size or diameter of the hole to be drilled for the thumb. Fourth and fifth signals respectively provide similar size or diameter information for the holes for the first and second fingers, respectively.

These outputs are respectively issued to a computer, generally designated 12, which processes the information and then provides certain control signals to the drilling apparatus.

The drilling apparatus is generally designated 14 and may be broken down into two basic blocks, a ball indexing section, generally designated 16, and a ball drilling section, generally designated 18.

Figure 2:
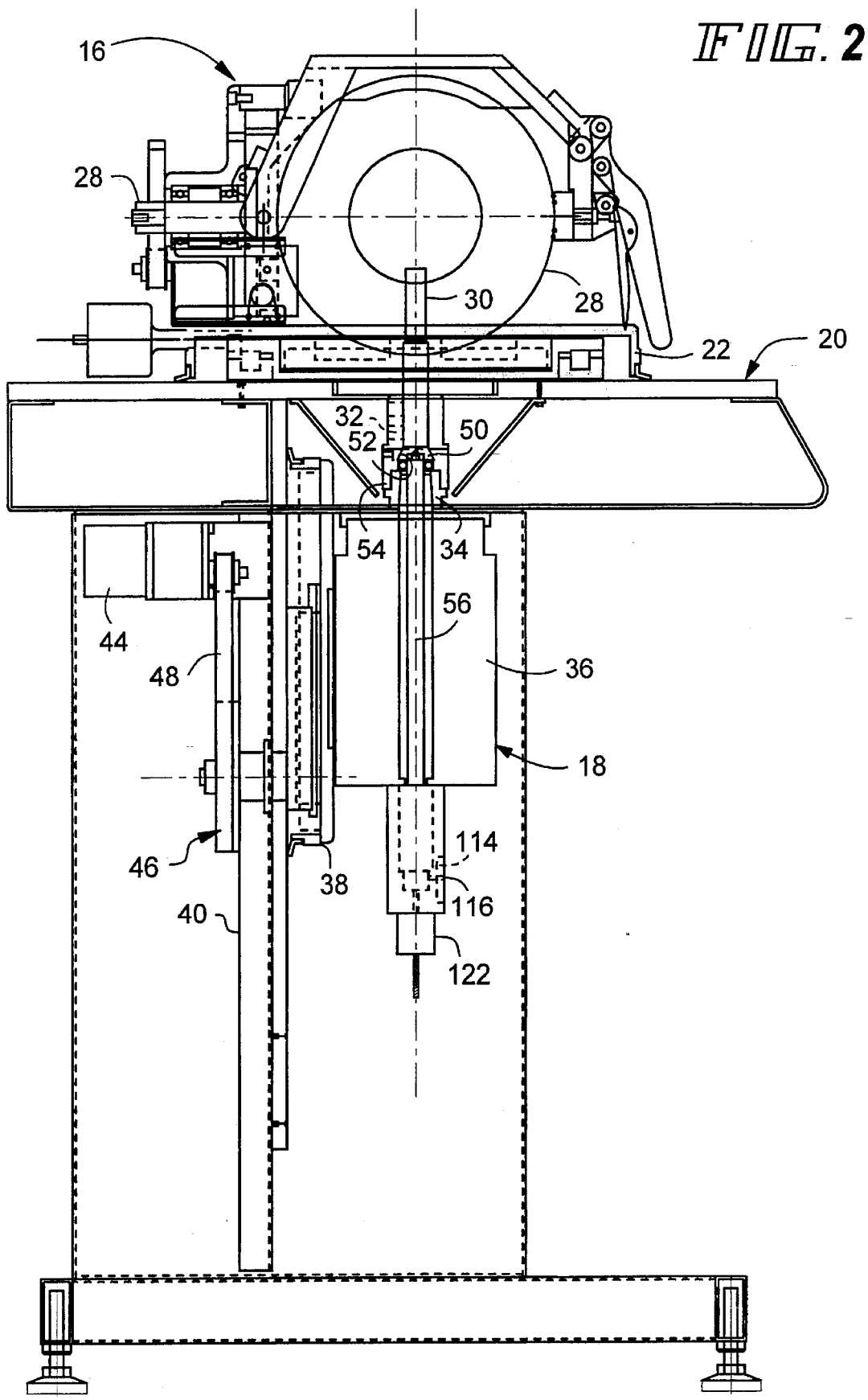
FIG. 2 is a side elevation of a drilling apparatus making up part of the fitting and drilling apparatus.

The ball indexing section is shown generally in FIG. 2. Reference may had to either of the previously identified copending applications for greater detail.

The apparatus includes a table, generally designated 20 on which a ball support carriage 22 is mounted. By means disclosed in the previously identified applications, the ball support 22 may be indexed on the table 20 in two mutually perpendicular directions, an "x" axis and a "y" axis, by an "x" drive 24 and a "y" drive 26, both schematically illustrated in FIG. 1.

In addition, a ball 28 on the support 22 may be rotated relative thereto through a predetermined angle θ by a rotational drive mechanism 28. The drives 24, 26 and 28 receive appropriate control signals in the form of pulse trains from the computer 12 so as to cause the carriage 22 to be indexed on the table 20 and the ball 28 to be rotated on the carriage 22 so that a drilling tool or spindle 30 (FIG. 2) will drill a hole into the ball at the proper location thereon.

As seen in FIG. 2, the drilling tool 30 is received in a chuck 32 which is connected to the rotary output shaft 34 of a drive motor 36. The drive motor 36 is mounted on a carriage 38 which is movable in an up and down direction on a frame 40 for the table 20. As will be described, the resulting ball drilling section 18 of the apparatus may have the drive motor 36 commanded to operate by the computer 12 to perform a drilling operation. In addition, a control motor 42 receives hole size information from the computer 12 to cause an adjustment in the ball drilling section 18 to set the same up to drill holes of a particular diameter.

Finally, the motor 44 is connected to a carriage drive system, generally designated 46, by a timing belt 48 and is operative to cause the carriage 38 to move upwardly or downwardly on the frame 40. Downward movement will cause the drilling tool 30 to move away or retract from the ball support 22 while upward movement will advance the drilling tool 30 into the ball 28 to drill a hole therein.

As described in greater detail in our co-pending application Ser. No. 08/380,077, the chuck 32 includes an elongated dove tail slide 50 on its lower most surface. The dove tail slide 50 is received in a dove tail slot 52 in a hub 54 connected to the shaft 34.

As can be seen in FIGS. 2 and 3, the shaft 34 is hollow and receives an elongated, adjustment rod 56. At its uppermost end, the rod 56 includes an eccentrically located pin 58 which journals a roller 60. The roller 60 is relatively snugly received in a slot 62 in the dove tail slide 50. The slot 62 is oriented so as to be at right angles to the direction of elongation of the dove tail slide 50. As a result of this configuration, it will be appreciated that rotation of the adjustment rod 56 will cause the chuck 32 to move back and forth in the direction of a bi-directional arrow 64 (FIG. 3). This has the effect of moving the drilling tool 30 toward and away from the rotational axis of the hollow shaft 34. The components are preferably configured so that for one extreme position of movement, the axis of the drilling tool 30 will be coincident with the rotational axis of the shaft 34. In this case, the hole that will be drilled by the drilling tool 30 will be equal to the diameter of the drilling tool 30, typically ⅝ of an inch. However, if the drilling tool 30 is moved so that its axis becomes spaced from the axis of rotation of the shaft 34, it will be appreciated that when the shaft 34 is rotated, the drilling tool 30 will move in an orbital path about the axis of rotation of the shaft 34. When so moving, the drilling tool 30 will drill a hole whose diameter is equal to the sum of the diameter of the drilling tool 30 and the spacing between the orbital path (as measured to the axis of the drilling tool 30) and the rotational axis of the shaft 34.

The adjustment mechanism whereby rotation of the shaft 56 relative to the shaft 34 is had to achieve the desired adjustment is illustrated in FIG. 3 and is seen to include a sleeve 70 which may be suitably coupled to the shaft 34 for rotation therewith. The sleeve 70 includes an opening 72 at one end 74 through which an end 76 of the rod 56 remote from the end having the pin 58 extends. The rod end 76 includes a helical spline 80 that is located within an enlarged diameter section 82 of the sleeve 70.

An elongated nut 84 is slidably received within the enlarged diameter section 82 of the sleeve 70 and includes radially inwardly directed, helical splines 86 which are received in the helical splines 80.

An axial slot 90 in the sleeve 70 receives a roller 92 journalled to the nut 84 by a threaded fastener 94. As a result, it will be appreciated that the nut 84 must rotate with the sleeve 70 but may move axially with respect thereto in and out of the enlarged diameter section 82. It will also be appreciated that because the helical spline 86 are engaged in the helical splines 80, as the nut 84 is reciprocated within the sleeve 70, the shaft 56 will be caused to rotate relative to the sleeve 70, and thus, the drive shaft 34. Thus, the sleeve 70 and the nut 84 define, along with the helical grooves 80 and the shaft end 76, a reciprocating to rotary motion conversion mechanism.

The nut, at its end 100 remote from the spline 86, includes a bearing cavity 102 receiving a bearing 104. A snap ring 106 confines the bearing 104 within the cavity 102.

Inwardly of the bearing 104 is a bearing retainer 108 which is coupled as by a threaded fastener to an anti-rotation hub 110. The bearing retainer 108 and the anti-rotation hub 110 contact only the inner race of the bearing 104 and consequently, the nut 84 may rotate relative to the bearing retainer 108 and the anti-rotation hub 110.

The bearing anti-rotation hub includes a transversely extending post 112 that extends transverse to the rotational axis of the shaft 34 and is disposed between a pair of spaced rails 114 shown in phantom in FIG. 3 and which typically would be located on the inside of a housing 116 (FIG. 2) secured to the carriage 38 and/or the drive motor 36 for movement therewith. Thus, even though the nut 84 may be rotating as a result of energization of the drive motor 36, the anti-rotation hub 110 will be held against rotation by the post 112 being located between the rails 114.

The anti-rotation hub 110 also mounts a switch actuator 118 that may change the condition of a switch 120 suitably mounted to the housing 116 by means not shown. It will be appreciated that the condition of the switch 120 will be changed when the nut 84 is at its extreme of movement out of sleeve 70. This is utilized to provide a home signal to the computer 12 to enable the use of an open loop control system.

A control motor 122 is mounted on the housing 116 and includes a reciprocal output shaft 124. The position of the shaft 124 in the direction of a bidirectional arrow 126 is determined by the number of pulses received by the motor 122 from the computer 12. The output 124 is connected to the anti-rotation hub 110 and as a consequence, it will be appreciated that if the system starts out in the home position, so many pulses will result in a corresponding advancement 84 of the nut into the sleeve 70 and a corresponding angular rotation of the rod 56 to move the drilling tool 30 in the direction of the arrow 64 to offset the same from the rotational axis of the shaft 34. By keeping track of the number of pulses provided to the control motor 122 during any given interval after the homing switch 120 has been actuated by the actuator 118, the offset or spacing between the rotational axis of the shaft 34 and the orbital path taken by the tool 30 upon energization of the motor 36 is always known. To avoid errors, it is preferred to home the system after each ball is drilled. No time is wasted in this procedure since such can occur while a drilled ball is being taken out of the machine and a new ball introduced into it. At the same time, because the control motor 122 is carried by the carriage 38 with the drive motor 36, the position of the drilling tool 30 may be adjusted "on the fly", that is, as the carriage 38 itself is being indexed and without deenergizing the motor 36. As a consequence, homing after each hole is bored is omitted and the ability to adjust on other operations are occurring is provided. This in turn considerably shortens the time required in the drilling part of the fitting and drilling cycle.

In a preferred embodiment of the invention, it is desired that the apparatus have the ability to drill holes having diameters ranging from ⅝" (0.625") up to 1¼" (1.250"). To this end, the drilling tool 30 has diameter equal to that of the smallest hole to be drilled, 0.625".

The eccentrically located pin 58 (FIG. 3) has its center line spaced from the center line of the shaft 56 by 0.156". The control motor 122, which is actually a step motor or linear actuator, provides for advancement or retraction of the output shaft 124 at the rate of 3,200 steps per inch while the pitch constant of the helical spline 80 on the rod or shaft 56 is 2.41169 radians per inch.

To obtain a desired hole radius, all that is necessary is to provide the linear actuator/motor 122 with the desired step position information. It can be shown that step position is determined according to the following equation:

$$StepPosition = \frac{spi \times \text{ArcSin}\left(\frac{(r - 1.5\,mr)}{cr}\right)}{rpt}$$

where r is the desired Hole Radius spi is the number of steps per inch (3200) of the step motor linear actuator Cr is the radius of the crank which is 0.156 inch in this embodiment mr is the constant "Minimum Radius" (0.3125 inch in this embodiment)

rpi is pitch constant of the adj. rod thread (2.41169 radians/inch)

Thus, it is possible to prepare a table indicating a step position for each hole diameter that the apparatus is to be capable of boring. Typically, hole diameters will be selectable in increments of 1/32 of an inch.

The overall geometry of the system is such that the rod 56 will be rotated exactly ½ of a turn in adjusting the apparatus to drill a hole of minimum diameter to drilling a hole of maximum diameter. What may be termed the "home position" is that occupied by the components when the apparatus is to set to drill a hole of the minimum possible diameter.

It will also be appreciated that the so called home position is not a "zero" position because the control equation is dealing with a sine function. Rather, the home position is selected as the negative of one extreme position of movement of the pin or crank 60 while the positive extreme position of movement is that for maximum hole diameter.

Figure 4:
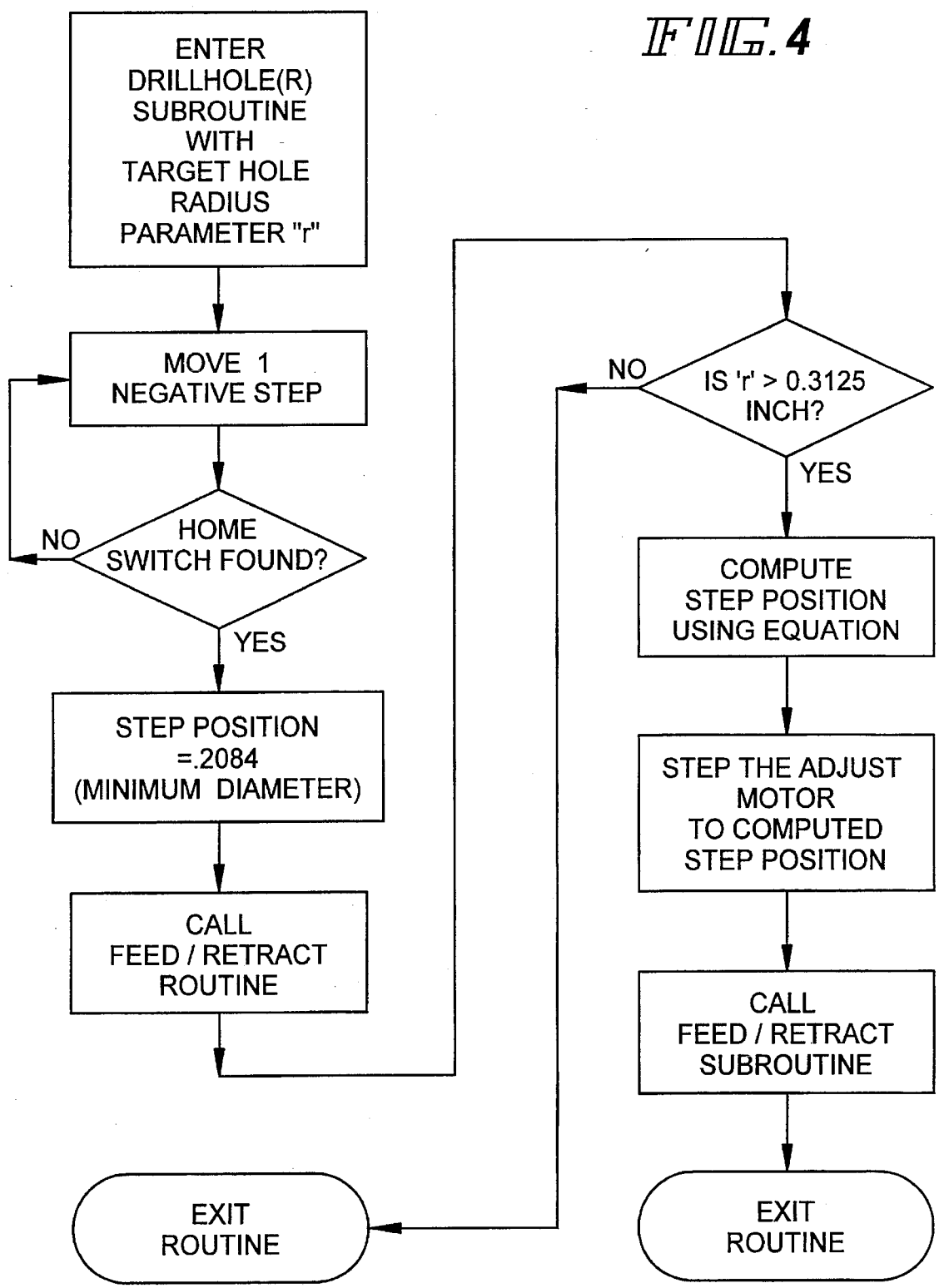
FIG. 4 is a flow diagram illustrating a sub-routine employed in drilling holes of selected sizes as determined by the fitting apparatus.

With the foregoing in mind, FIG. 4 illustrates programming of the apparatus, specifically, a computer 12 (FIG. 1), to drill a hole of a given diameter. Once the computer 12 is provided with all the information required, and the ball is properly indexed with respect to the drilling apparatus, the apparatus enters the "drill hole" subroutine illustrated in FIG. 4 as indicated by block 130. The motor 122 is moved one step in the negative direction, that is, toward the home position, as indicated by a block 132 and a determination is made as shown at block 134 as to whether the home switch 120 (FIG. 3) has had its condition changed by its actuator 118. If no, the program returns to the block 132 to cause the motor 122 to take one more step in the negative direction. This occurs until the home switch 120 changes its condition, at which time the subroutine notes that, for the geometry mentioned previously, the motor 122 is at step position minus 2084, which is the home position in the embodiment shown, for drilling the minimum diameter hole in the ball. This is shown at block 136.

The apparatus then proceeds into a feed/retract routine shown at block 138 which causes the minimum diameter hole to be drilled in the ball.

Following that, the subroutine proceeds to the block 140 at which point a determination is made as to whether the targeted hole radius or "r" is greater than 0.3125", that is to say, is the hole supposed to be greater than the minimum hole diameter of ⅝ of an inch. If the answer is no, subroutine is exited as indicated by the block 142. Conversely, if the answer is yes, the subroutine proceeds to a block 144. At this point, the computer 12 uses the equation set forth above to determine the desired step position for the target hole radius. After that determination is made, the program proceeds to a box 146 where the motor 122 is stepped to the computed step position. The feed/retract subroutine is then entered once again at the block 148 and a hole drilled, using the previously drilled ⅝" diameter hole as a pilot hole for the drilling of a larger diameter hole.

Once the hole is drilled and the apparatus retracted, the same proceeds to exit the routine as shown at a block 150.

It is important to note that the adjustment procedure does not require that the drive motor 18 (FIG. 2) be stopped or brought to a halt to accomplish an adjustment. That is to say, adjustments may be made "on the fly", thereby minimizing the time required to perform any given drilling operation.

We claim:

1. An apparatus for use in fitting bowling balls to bowlers and for drilling the balls comprising:

a fitting apparatus usable by a bowler to determine the size of a thumb hole and at least one finger hole to be drilled in a bowling ball; and a drilling apparatus including a ball support, a rotatable drilling tool, said ball support and said drilling tool being mounted for relative movement toward and away from each other to effect drilling of a ball on said ball support; means for rotating said drilling tool; means for moving said drilling tool in an orbital path; and means for varying the diameter of said orbital path to thereby vary the diameter of a hole drilled in said ball including a control motor responsive to said fitting apparatus;

said control motor being carried by said means for rotating said drilling tool.

2. The apparatus of claim 1 wherein said drilling apparatus includes a frame mounting said ball support, and a carriage mounted on said frame for movement toward and away from said ball support to effect said relative movement, said rotating means and said control motor being mounted on said carriage.

3. The apparatus of claim 2 wherein said means for moving said drill in an orbital path includes a connection between said tool and said tool rotating means and an offset in said connection.

4. The apparatus of claim 3 wherein said varying means comprises means for selectively increasing or decreasing said offset.

5. The apparatus of claim 1 wherein said drilling apparatus includes a carriage mounted for movement toward and away from said ball support; said rotating means comprises a motor having a hollow rotary output shaft rotatable about an axis; a chuck mounting said drilling tool and located adjacent one end of said shaft; a slide interconnecting said chuck and said shaft and movable in a plane intersecting said axis; a control rod within said shaft and rotatable therein and coupled to said slide such that rotation of said rod relative to said shaft will cause said slide to move said chuck toward or away from said axis; and a reciprocating-to-rotary motion converting mechanism rotatable with said shaft and at the other end of said shaft and coupled to said rod; said control motor having a reciprocating output connected to said converting mechanism.

6. The apparatus of claim 5 wherein said reciprocating-to-rotary motion conversion mechanism includes a helical spline on the end of said rod remote from said chuck and a nut having a helical interior cavity received on said rod remote end and reciprocal along said remote end; said nut further being mounted for reciprocation relative to said shaft and along said axis and fixed to said shaft for rotation therewith.

7. An apparatus for use in fitting bowling balls to bowlers and for drilling the balls comprising:

a fitting apparatus usable by a bowler to determine the size of a thumb hole and at least one finger hole to be drilled in a bowling ball;

a drilling apparatus including:

a frame;

a ball support on said frame;

a carriage mounted on said frame for movement toward and away from said ball support;

a drilling tool mounted on said carriage and movable in an orbital path around an axis;

an adjusting mechanism for altering the distance between said axis and said orbital path; and a control motor mounted on said carriage and responsive to said fitting apparatus for driving said adjusting mechanism.

8. The apparatus of claim 7 further including a drive motor on said carriage for driving said drilling tool in said orbital path and having a rotary output shaft, said adjusting mechanism coupling said tool to said shaft and being rotatable with said shaft, and a rotatable coupling between said adjusting mechanism and said control motor whereby said shaft may rotate relative to said control motor.

9. The apparatus of claim 8 wherein said shaft is hollow and said adjusting mechanism includes a rod within said shaft and a reciprocating-to-rotary motion conversion mechanism having a reciprocal input and a rotary output to said rod; said control motor having a reciprocal output, said rotary coupling connecting said reciprocal input and said reciprocal output.

10. The apparatus of claim 9 wherein said rotary output comprises a helical end on said rod and said reciprocal input comprises a nut with a helical cavity receiving said helical end.

11. The apparatus of claim 10 wherein said control motor is a bi-directional stepper motor and further including a home sensing switch on said carriage, and an actuator for said switch and axially movable with said nut.

* * * * *